Nov. 10, 1942. R. E. MAYO Re. 22,221

AIR-CONDITIONED TOBACCO BARN

Original Filed Dec. 12, 1935 3 Sheets-Sheet 1

Reubin E. Mayo, INVENTOR

BY Victor J. Evans & Co.

ATTORNEYS.

P. L. Hickey

WITNESS

Nov. 10, 1942. R. E. MAYO Re. 22,221
AIR-CONDITIONED TOBACCO BARN
Original Filed Dec. 12, 1935 3 Sheets-Sheet 2
Fig. 2.
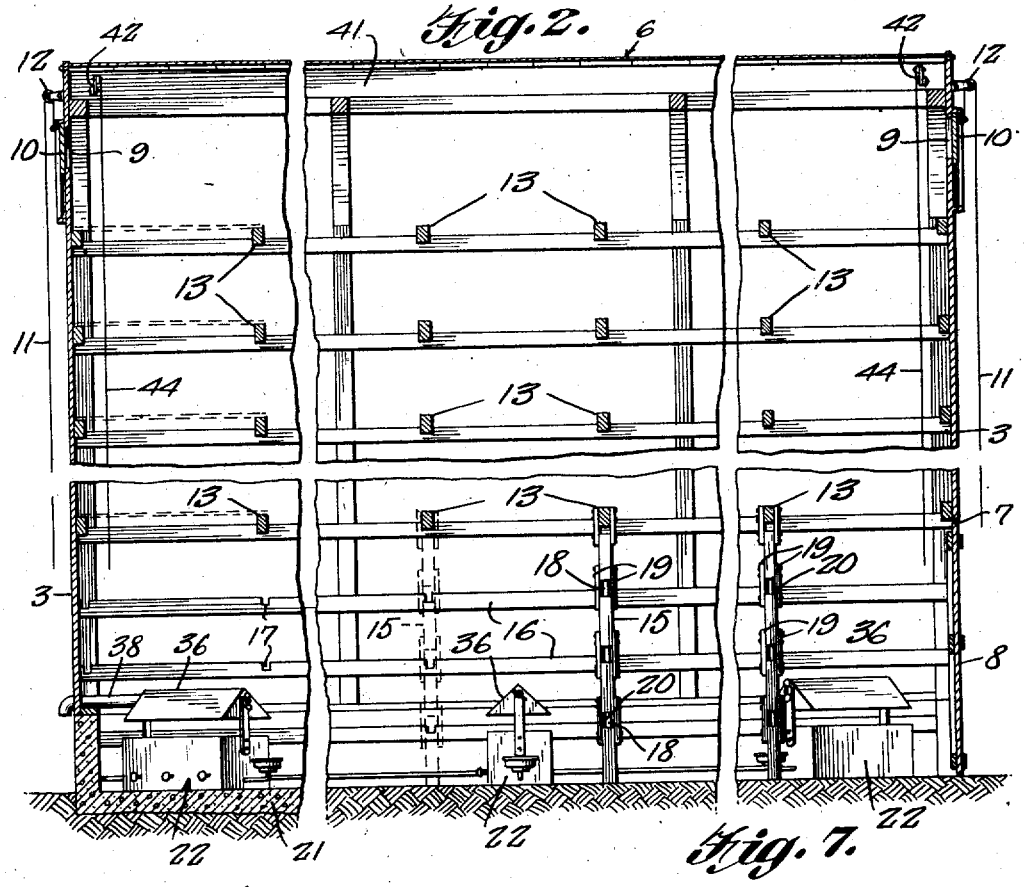
Fig. 7.
Fig. 6.
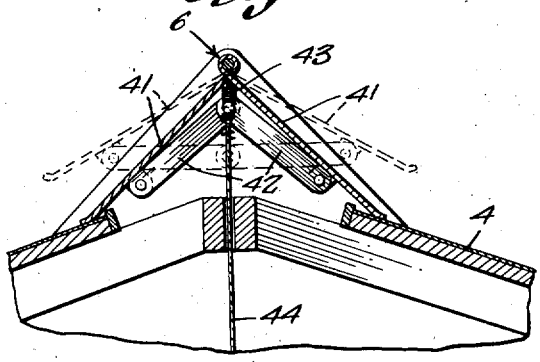
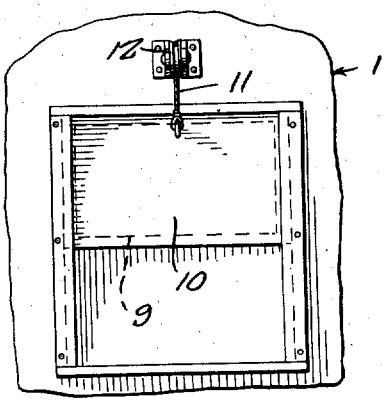
Reubin E. Mayo, INVENTOR
BY Victor J. Evans & Co.
ATTORNEYS.
P. J. Shirley
WITNESS Nov. 10, 1942. R. E. MAYO Re. 22,221

AIR-CONDITIONED TOBACCO BARN

Original Filed Dec. 12, 1935 3 Sheets-Sheet 3

Reubin E. Mayo, INVENTOR

BY Victor J. Evans & Co. ATTORNEYS.

P. J. Hickey WITNESS

Reissued Nov. 10, 1942

Re. 22,221

UNITED STATES PATENT OFFICE 22,221

AIR-CONDITIONED TOBACCO BARN

Reubin E. Mayo, Snow Hill, N. C.

Original No. 2,090,633, dated August 24, 1937, Serial No. 54,135, December 12, 1935. Application for reissue August 14, 1939, Serial No. 290,080

6 Claims. (Cl. 263—43)

This invention relates to tobacco curing buildings or barns, and has for the primary object the provision of a device of this character wherein tobacco while arranged on curing racks may be subjected to artificial heat to assure rapid and efficient curing of said tobacco within a minimum length of time, the air being taken from the exterior of the building and heated to a desired temperature for passage upwardly in the building about the tobacco and exhausting through the roof of the building, said air being controlled both at the intake and exhaust, so that the air within the building will be conditioned properly to bring about the best curing results and reduce tobacco sweating and the damages to tobacco incident thereto.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view showing a tobacco curing house or barn constructed in accordance with my invention.

Figure 2 is a longitudinal sectional view illustrating the same.

Figure 6 is a fragmentary vertical sectional view showing the means of controlling the exhaust of air from the building.

Figure 7 is a detail view showing one of the ventilators arranged in the end walls of the building.

Figure 1:
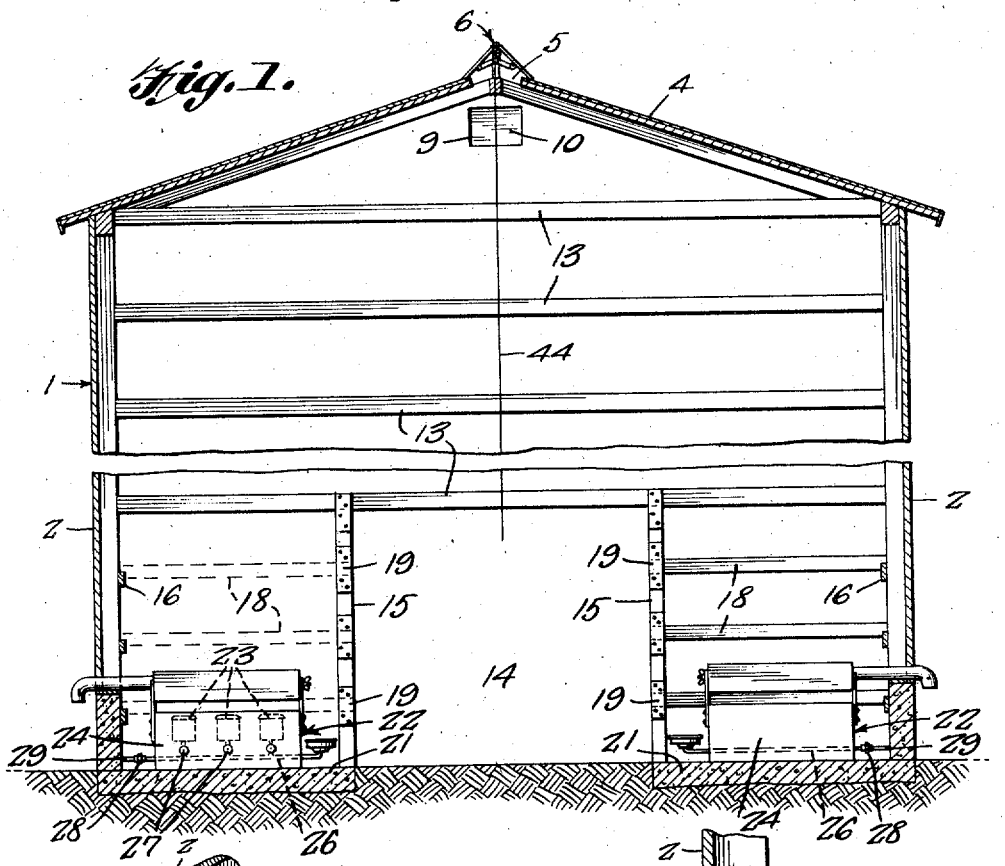
Figure 4:
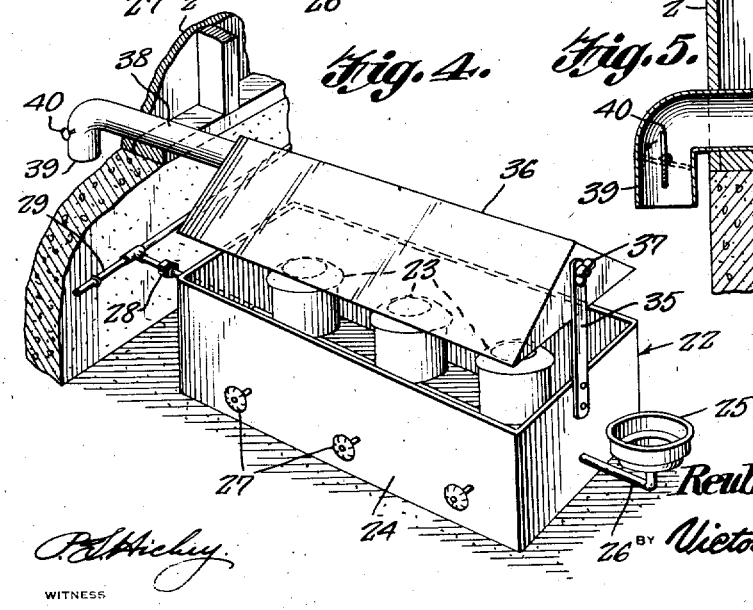
Figure 4 is a fragmentary perspective view, partly in section, showing one of the heating mediums.
Figure 5:
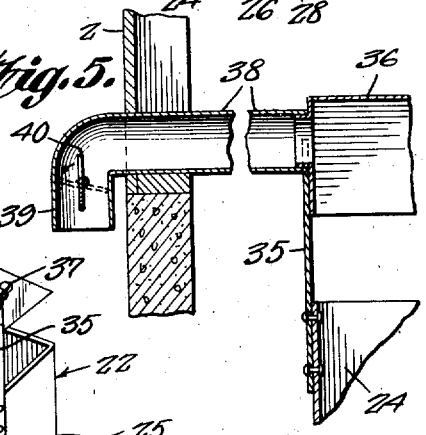
Figure 5 is a fragmentary sectional view showing the air intake of the heating means.

Referring in detail to the drawings, the numeral 1 indicates in entirety a building or barn especially adapted for the curing of tobacco and is so constructed that air may be regulated through the interior thereof and artificially heated to efficiently and rapidly cure the tobacco. The building or barn includes side and end walls 2 and 3 with a gable-type roof 4 having ventilating openings 5 controlled by a ventilator 6. One of the end walls 3 has a doorway 7 closed by a hinged door 8, and both end walls adjacent the roof 4 have ventilating openings 9 controlled by slidable ventilators 10 operated by flexible elements 11 trained over pulleys 12. The flexible elements extend within reach of a person on the ground, so that the ventilators 10 may be raised or lowered for varying the size of the ventilator openings 9.

Arranged within the upper portion of the building or barn 1 is a plurality of superimposed permanent racks 13 consisting of bars arranged to extend both transversely and longitudinally of the building. The bars of the racks are fastened in any suitable way to the walls of the building. The lowermost rack is spaced a desired distance from the floor to give head room within the building.

A center aisle 14 extends from the doorway 7 and is defined by vertical members 15 extending from the floor to the lowermost rack 13. The walls of the building opposite to the members 15 have secured thereto supporting strips or cleats 16 having notches 17 to receive removable racks 18 in the form of bars. The members 15 are each of sectional formation joined together, as shown at 19, defining between each section a slot 20. The slots 20 align horizontally with the notches 17 of the supporting strip so that the racks 18 may be slid through the slots 20 into the notches 17. The temporary racks are employed when bringing tobacco into the building by way of the doorway 7, the workers placing the tobacco onto the temporary racks where the tobacco can be obtained by other persons standing higher up in the building for the purpose of placing said tobacco on the permanent racks 13. The temporary racks may be readily removed at any time desired.

Figure 3:
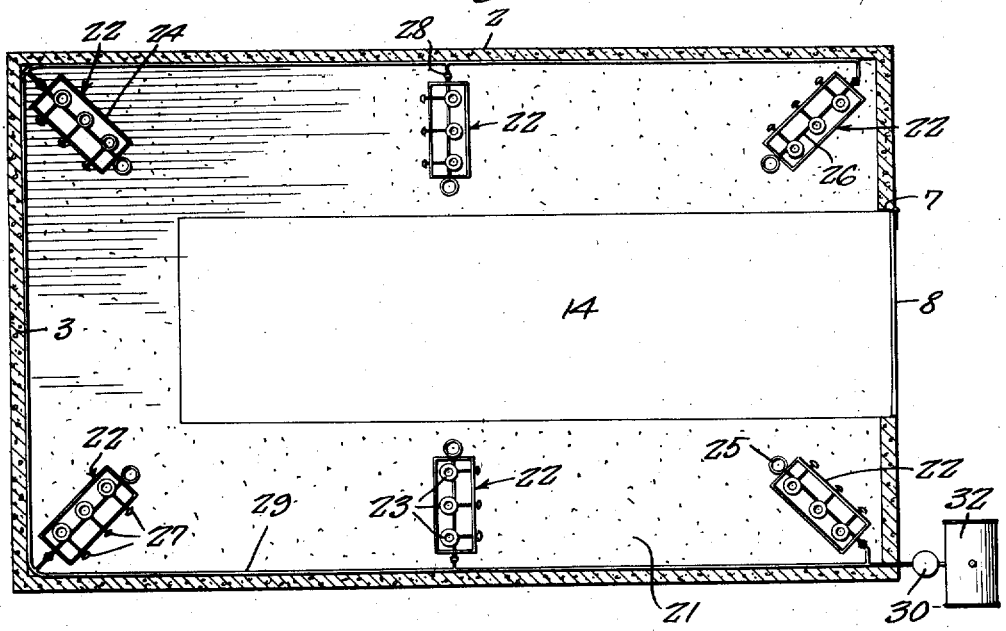
Figure 3 is a horizontal sectional view showing the arrangement of the heating means.
Figure 8:
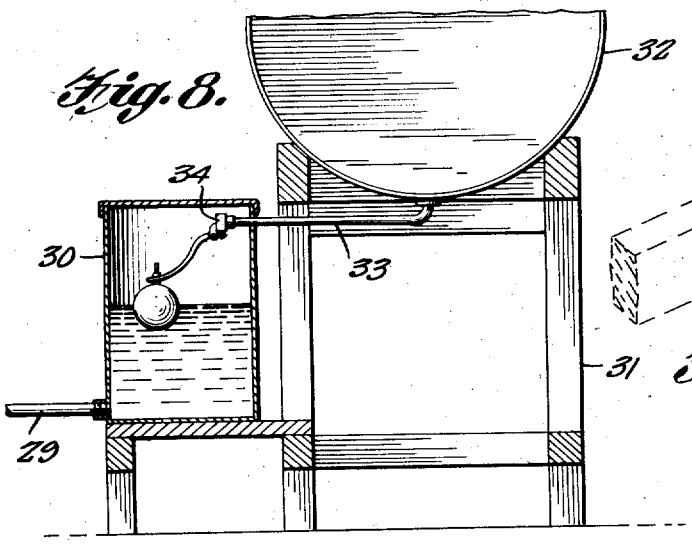
Figure 8 is a fragmentary sectional view showing the fuel supply means for the heating means.
Figure 9:
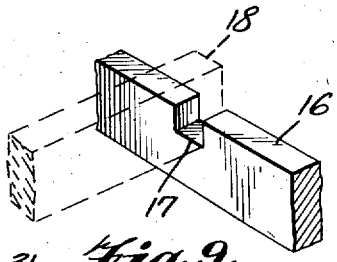
Figure 9 is a fragmentary perspective view showing means of mounting one of the temporary racks.

A concrete flooring 21 is provided between the walls of the building and the aisle 14. The concrete flooring is level on which rests a plurality of heating means 22. The arrangement of the heating means is clearly shown in Figure 3, and each means is in the form of a liquid fuel stove having a plurality of open-top burners 23 positioned within a casing 24, the top of which is open. Burners of this kind may be found upon the market employed for various purposes, said burners being supplied with fuel from a fuel feed means 25 of a conventional construction, and which includes a pipe 26 leading to the burners and equipped with control valves, each having a control medium 27. The heating means 22 rests upon the floor and may be removed from the building at any time desired, so that they may be employed for other purposes. Each heating means or the pipe 26 thereof when employed in the barn is closed or plugged at the supply means 25, and the opposite end of the pipe has a union or coupling 28 for connecting said pipe to a feed pipe 29 extending about the interior of the building. The feed pipe at one end extends through a wall of the building and connects to a reservoir 30. The reservoir 30 is mounted on a suitable stand 31 exteriorly of the building, and also the stand supports a barrel of fuel oil 32. Leading from the barrel to the reservoir 30 is a pipe 33 equipped with a float controlled valve 34. The float controlled valve is arranged in the reservoir 30 and regulates the amount of oil or fuel in the reservoir. By this arrangement as the fuel in the reservoir is consumed by the heating means, it is replenished automatically from the barrel 32. The pipe 33 is removable from the barrel 32, so that when the barrel is exhausted, another barrel may be substituted therefor and connected with the pipe 33.

Each heating means 22 or the casing 24 thereof has upstanding arms 35 for supporting a hood 36 over the burners 23 and spaced from the casing 24. Bolts are secured to the hood 36 and extend through the arms 35 and have threaded thereto wing nuts 37, which permit the adjustment of the hood 36 to regulate the passing of the heat upwardly in the building from the burners. One end of the hood is connected with an air intake pipe 38, which extends through the building to the exterior thereof, and has a downwardly depending end 39. A damper 40 is located in the end 39 whereby the air passing into the hood may be regulated.

In operation, after the tobacco has been arranged in the building for curing, the burners are lighted and the air taken in from the exterior of the building by way of the pipes 38 is artificially heated, conditioning said air so as to bring about rapid and efficient curing of the tobacco during the passing upwardly of the heated air to the ventilating openings 5 and 9.

The ventilator 6 includes hingedly mounted plates 41 movable towards and from the roof for opening and closing the ventilating openings 5. The plates 41 are pivotally connected to links 42. The links are arranged in pairs and the links of each pair are pivotally connected and have connected thereto springs 43 acting to urge the plates 41 into engagement with the roof. Connected to the pairs of links are flexible elements 44 depending in reach of a person on the ground, so that the plates 41 may be swung away from the roof to open the ventilating openings 5.

The pairs of links assume angularly related positions relative to each other when the plates 41 contact the roof, and when actuated by the flexible elements 44 move into parallelism so as to support the plates 41 in ventilator opening position.

I claim:

1. A tobacco curing barn including an enclosure provided with vertically disposed side and end walls, and a roof and a doorway in one of the end walls, a tobacco rack supported by the walls above said doorway, rows of vertically disposed members arranged below the rack and defining a center aisle extending from the doorway, and each member consisting of connected spaced sections defining slots, supporting strips secured to walls of the enclosure and arranged in horizontal alignment with the slots, rack bars extending through the slots into engagement with the supporting strips on which tobacco may be temporarily placed prior to being positioned on the tobacco rack, heating devices located in the enclosure between the walls thereof and the aisle, and ventilating means in the roof above the aisle.

2. An air conditioned tobacco curing barn including vertically disposed side walls and a roof, at least one of said side walls having a doorway therein, said barn having a ventilating opening at its roof, tobacco racks within the barn, and air conditioning units within the barn, each comprising a casing, heating means of the open flame type within the casing, a hood overlying the casing and vertically spaced therefrom, means for supporting the hood in said relation, and an air intake pipe opening into the space above the heating means and extending through a side wall of the barn to receive fresh air, whereby fresh air from the outside will be mixed in said hood with the heated gases from the burner and will thereby be conditioned before passing upwardly into the barn.

3. An air conditioned tobacco curing barn according to claim 2 in which the opening of said air intake pipe outside of said building is at a lower level than the opening of said pipe above said heating means.

4. An air conditioned tobacco curing barn according to claim 2 in which said means for supporting the hood permits its adjustment to various inclinations.

5. An air conditioned tobacco curing barn according to claim 2 in which said air intake pipe is provided with means for variably controlling the flow of air therethrough.

6. An air conditioned tobacco curing barn according to claim 2 which includes means for variably controlling the flow through said ventilating opening at its roof.

REUBIN E. MAYO.